United States Patent
Dale et al.

(10) Patent No.: US 8,300,657 B2
(45) Date of Patent: *Oct. 30, 2012

(54) MODIFIED RANGE REQUESTS ENABLING BANDWIDTH REQUESTS AND STATE OF HEALTH REPORTING

(75) Inventors: Mark R. Dale, Laguna Hills, CA (US); David L. Hartman, Laguna Hills, CA (US); Alan Gin, Corona Del Mar, CA (US); Jen-chieh Chien, Lake Forest, CA (US); Anders Hebsgaard, Lawrenceville, GA (US); Rocco J. Brescia, Jr., Newport Coast, CA (US); Cho-Hsin J. Wang, Irvine, CA (US); Alan Y. Kwentus, San Juan Capistrano, CA (US); Dorothy D. Lin, Laguna Beach, CA (US)

(73) Assignee: Broadcom Corporation, Irvine, CA (US)

( * ) Notice: Subject to any disclaimer, the term of this patent is extended or adjusted under 35 U.S.C. 154(b) by 64 days.

This patent is subject to a terminal disclaimer.

(21) Appl. No.: 12/758,652

(22) Filed: Apr. 12, 2010

(65) Prior Publication Data
US 2010/0198974 A1  Aug. 5, 2010

Related U.S. Application Data

(63) Continuation of application No. 10/186,718, filed on Jul. 2, 2002, now Pat. No. 7,729,373.

(51) Int. Cl.
*H04J 3/02* (2006.01)
(52) U.S. Cl. .......... 370/462; 370/522; 455/69; 709/226
(58) Field of Classification Search .................. None
See application file for complete search history.

(56) References Cited

U.S. PATENT DOCUMENTS

| | | | |
|---|---|---|---|
| 6,519,449 B1 * | 2/2003 | Zhang et al. | 455/69 |
| 6,697,378 B1 * | 2/2004 | Patel | 370/468 |
| 6,944,881 B1 * | 9/2005 | Vogel | 725/111 |
| 7,164,697 B1 * | 1/2007 | Beser | 370/485 |
| 2003/0081582 A1 * | 5/2003 | Jain et al. | 370/338 |
| 2003/0103527 A1 * | 6/2003 | Beser | 370/468 |
| 2004/0034871 A1 * | 2/2004 | Lu et al. | 725/111 |

OTHER PUBLICATIONS

"Superseded Data Over Cable Service Interface Specifications", Cable Television Laboratories, Inc., Jul. 31, 1999.*
Kitroser et al, "Bandwidth Request using CDMA Codes in OFDMA (OFDM) Base PHY for TG3 and TG4", IEEE 802.16.3c-01/55, Apr. 25, 2001.*
English language abstract of EP 0 735 696 A2, European Patent Office, Data supplied from the espacenet database—EP, published Oct. 2, 1996.
English language abstract of FR 2 675 970 A1, European Patent Office, Data supplied from the espacenet database—EP, published Oct. 30, 1992.

* cited by examiner

*Primary Examiner* — Yemane Mesfin
*Assistant Examiner* — Khoa Huynh
(74) *Attorney, Agent, or Firm* — Sterne, Kessler, Goldstein & Fox P.L.L.C.

(57) ABSTRACT

A modified ranging request in a broadband communications system. The modified ranging request includes a header, a management message header attached to the header, a management message payload attached to the management message header, and a CRC attached to the management message payload. The management message header enables bandwidth requests to be made by subscriber equipment without contention. The management message header also includes state of health information on the status of a downstream transmission for enabling a central location to determine how to assign subscribers to queues in an adaptive modulation scheme.

22 Claims, 7 Drawing Sheets

MODIFIED RANGE REQUESTS ENABLING BANDWIDTH REQUESTS AND STATE OF HEALTH REPORTING

CROSS REFERENCE TO RELATED APPLICATIONS

The present application is a continuation of U.S. Provisional Patent Appl. No. 10/186,718, filed Jul. 2, 2002, entitled "Modified Range Requests Enabling Bandwidth Requests and State of Health Reporting," which is incorporated by reference herein in its entirety.

BACKGROUND OF THE INVENTION

1. Field of the Invention

The present invention is generally related to broadband communications systems. More particularly, the present invention is related to broadband communication systems that use Data Over Cable Service Interface Specification (DOCSIS) or any of its derivatives.

2. Background

In DOCSIS related broadband communications architectures, data is transferred between a central location and many remote subscribers. The central location may be referred to as a headend for cable systems, a wireless access termination system (WATS) for broadband terrestrial fixed wireless systems, or a satellite gateway for two-way satellite systems. Subscriber equipment may be referred to as a cable modem (CM) for cable systems, a wireless modem (WM) for broadband terrestrial fixed wireless systems, or a satellite modem (SM) for two-way satellite systems.

In a two-way satellite system, the communication path from the satellite gateway to the SM is called the downstream. The communication path from the SM to the satellite gateway is called the upstream.

Each SM is provided with one or more service identifiers (SIDs) and an address for identification purposes. Present DOCSIS protocol requires the upstream channel to be divided into a stream of mini-slots. The satellite gateway generates the time reference for identifying these mini-slots and controls access to these mini-slots by the SMs. The start time and duration of each mini-slot is relative to a master reference maintained by the satellite gateway. The master reference is distributed to the SMs via SYNC and upstream channel descriptor (UCD) packets. SMs may issue requests to the satellite gateway for upstream bandwidth. The satellite gateway must transmit an allocation MAP on the downstream channel defining the allowed usage of each mini-slot. For example, the satellite gateway may grant a plurality of contiguous mini-slots to an SM to transmit data. The SM must, in turn, time its transmission so that the satellite gateway receives it in the time reference specified.

The allocation MAP is a variable length MAC management message that is transmitted by the satellite gateway to the SMs to define transmission opportunities on the upstream channel. The allocation MAP includes a fixed-length header and a plurality of information elements (IEs). Each information element defines the allowed usage for a range of mini-slots. A Request IE indicates an upstream interval in which SMs may request bandwidth for upstream data transmission. In an embodiment, this may be an invitation for SMs to contend for bandwidth requests.

An SM will receive the allocation MAP and scan it for request opportunities. During a contention transmit opportunity, the SM will transmit a request for the number of mini-slots needed to accommodate a PDU (protocol data unit) that the SM desires to send. After the contention transmission, the SM will wait for a Data Grant (Data Grant Pending) or Data Acknowledge in a subsequent allocation MAP. Once the Data Grant or Data Acknowledge is received, contention resolution is complete.

In many instances the request during a contention transmission may collide with requests from other SMs and be lost. The SM will be on notice that the contention transmission was lost (i.e., a collision occurred) when a subsequent allocation MAP includes an ACK time indicating that the request would have been received and processed, yet fails to include an acknowledgment of the request. The SM must then perform a back-off algorithm, such as, for example, a binary exponential back-off algorithm, and retry. Often times multiple collisions occur causing the SM to have to backoff several times before bandwidth is allocated or until the maximum number of retries has been reached. If the maximum number of retries is reached without bandwidth being allocated, the PDU is discarded.

Two-way satellite communications systems posses a half second round trip delay. If continuous collisions occur for an SM during a bandwidth request, the round-trip delays accumulate, thereby consuming a considerable amount of time. As a result, undesired lags in service will occur. Also, in cases where a large number of subscribers are on these channels, one would not want to devote large amounts of resources to these request regions.

In other applications, it might be desirable for the satellite gateway to receive information about the status of a downstream transmission received by a given subscriber. For example, to implement an adaptive modulation scheme, such information could be used to match SMs with appropriate downstreams. Useful state of health information might include, but is not limited to, downstream codeword error rates (CER) and signal-to-noise ratio (SNR).

One could provide such information to the satellite gateway via a high level protocol, such as SNMP (Simple Network Management Protocol), or via other network management communication methods where each SM is periodically polled for the information. Upon receiving the information, network management would then update a database that stores such information. The down side to such methods is that they require a great deal of processor power and consume both upstream and downstream bandwidth. For example, bandwidth would be utilized to make the request for information to each SM on the downstream and the satellite gateway would have to retrieve the information coming upstream by parsing an entire IP stack.

Therefore, what is needed is a mechanism for providing information about the status of a downstream transmission received by a given subscriber that does not require a great deal of processor power. Also what is needed is a mechanism for enabling bandwidth requests that are not subject to contention.

BRIEF SUMMARY OF THE INVENTION

The present invention solves the above-mentioned problems by providing a mechanism for enabling the central location, such as a satellite gateway, headend, or WATS in a broadband communications system, to receive information relating to the status of a downstream transmission received by a given subscriber. The present invention further enables bandwidth requests from SMs, CMs, or WMs, to be made without being subject to contention. The present invention accomplishes this by enabling bandwidth requests and information relating to the status of a downstream transmission received by a given subscriber to be sent to the central location via a MAC Management Message called a ranging request.

Briefly stated, the present invention is directed to a modified ranging request in a broadband communications system. The modified ranging request includes a header, a management message header attached to the header, a management message payload attached to the management message header, and a CRC (cyclic redundancy check) attached to the management message payload. The management message header enables bandwidth requests to be made by subscriber equipment without contention. The management message header also includes state of health information on the status of a downstream transmission for enabling a central location to determine how to assign subscribers to queues in an adaptive modulation scheme.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art(s) to make and use the invention.

Figure 1:
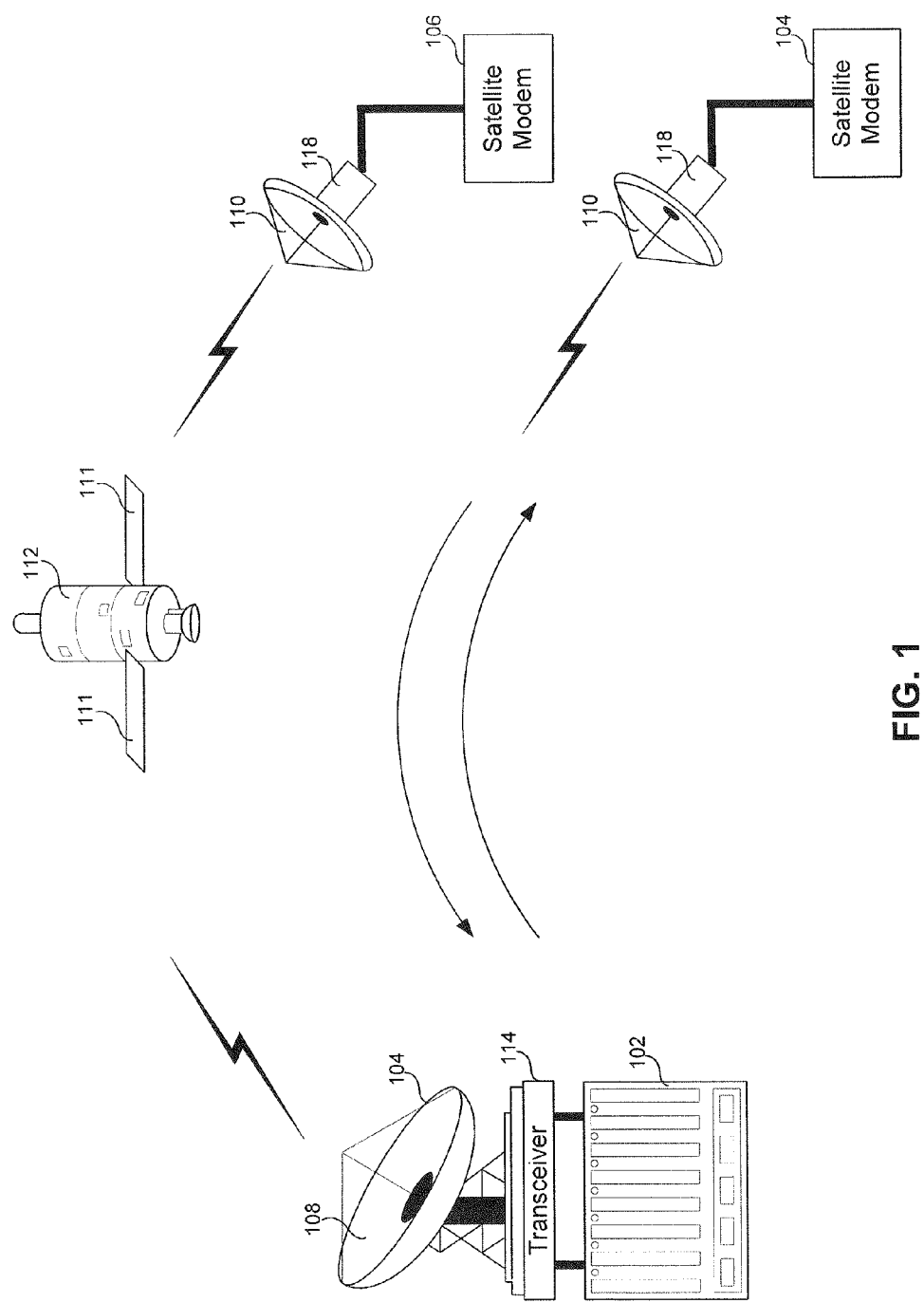
FIG. 1 is a high level block diagram of an exemplary broadband two-way satellite communications system in accordance with embodiments of the present invention.

The features and advantages of the present invention will become more apparent from the detailed description set forth below when taken in conjunction with the drawings in which like reference characters identify corresponding elements throughout. In the drawings, like reference numbers generally indicate identical, functionally similar, and/or structurally similar elements. The drawings in which an element first appears is indicated by the leftmost digit(s) in the corresponding reference number.

DETAILED DESCRIPTION OF THE INVENTION

While the present invention is described herein with reference to illustrative embodiments for particular applications, it should be understood that the invention is not limited thereto. Those skilled in the art(s) with access to the teachings provided herein will recognize additional modifications, applications, and embodiments within the scope thereof and additional fields in which the present invention would be of significant utility.

FIG. 1 is a high level block diagram of an exemplary broadband two-way satellite communications system 100 in accordance with embodiments of the present invention. Although the present invention is described using a broadband two-way satellite communications system, the present invention is also applicable to other broadband communications systems. Such systems may include, but are not limited to, broadband cable systems and broadband terrestrial fixed wireless systems. Broadband two-way satellite communications system 100 enables voice communications, video and data services based on a bi-directional transfer of packet-based traffic between a satellite gateway 102 and one or more satellite modems (SM), such as satellite modems 104 and 106, via a satellite 112. Satellite 112 is a vehicle or platform designed to orbit the earth. Satellite 112 contains electronic devices for originating and/or relaying telecommunications, data, etc. between satellite gateway 102 and one or more satellite modems, such as SMs 104 and 106. For example, in an embodiment of the present invention, satellite 112 receives packet-based traffic from satellite gateway 102 and relays such traffic to one or more satellite modems, such as satellite modems 104 and 106. Satellite 112 also receives packet-based traffic from satellite modems, such as satellite modems 104 and 106, and sends such traffic to satellite gateway 102. Although broadband two-way satellite communications system 100 is shown with only two satellite modems, any number of satellite modems may be included in the broadband two-way satellite communications system 100 of the present invention.

Bi-directional transfer of packet-based traffic is achieved using antennas, such as antennas 108, 109, 110, and 111, and transceivers 114, 116 and 118. Satellite 112 is coupled to antennas 111 for receiving and transmitting information. Antenna 108 is coupled to satellite gateway 102 via transceiver 114 for transmitting/receiving packet-based traffic to/from SMs 104 and 106, respectively, via satellite 112. Antennas 109 and 110 are coupled to SMs 104 and 106 via transceivers 116 and 118, respectively, for transmitting/receiving packet-based traffic to/from satellite gateway 102, via satellite 112. The communication path from satellite gateway 102 to satellite modems 104 and 106 is called the downstream. The communication path from satellite modems 104 and 106 to satellite gateway 102 is called the upstream.

Satellite gateway 102 is a central distribution point for broadband two-way satellite communications system 100. Satellite gateway 102 manages the upstream and downstream transfer of data between satellite gateway 102 and satellite modems, such as satellite modems 104 and 106, via satellite 112. Satellite gateway 102 broadcasts information downstream to satellite modems 104 and 106 as a continuous transmitted signal in accordance with a time division multiplexing (TDM) technique. Satellite gateway 102 also controls the upstream transmission of data from satellite modems 104 and 106 to satellite gateway 102 by assigning to each satellite modem (104 and 106) slots within which to transfer data in accordance with a time domain multiple access (TDMA) technique. Thus, each satellite modem (104 and 106) sends information upstream as short burst signals during a transmission opportunity allocated by satellite gateway 102.

Each of satellite modems 104 and 106 operates as an interface to a user device (not shown). User devices may include, but are not limited to, personal computers, data terminal equipment, telephony devices, broadband media players, personal digital assistants, network-controlled appliances, or any other device capable of transmitting or receiving data. Satellite modems 104 and 106 perform the functions necessary to convert downstream signals received over broadband two-way satellite communications system 100 into data packets for receipt by an attached user device. Satellite modems 104 and 106 perform the functions necessary to convert data signals received from the user devices into upstream burst signals suitable for transfer over broadband two-way satellite communications system 100.

In exemplary broadband two-way satellite communications system 100, satellite modems 104 and 106 operate in formats that adhere to the protocols set forth in the DOCSIS specification as well as proprietary protocols that extend beyond the DOCSIS specification. Additionally, satellite gateway 102 operates to transmit, receive and process data transmitted to it in accordance with the protocols set forth in the DOCSIS specification and can also operate to transmit, receive and process data packets that are formatted using proprietary protocols that extend beyond those provided by the DOCSIS specification. The manner in which satellite modems 104 and 106 operate to receive data will be described in further detail herein. The manner in which satellite gateway 102 operates to transmit and process data will also be described in further detail herein. The following description will now concentrate on the upstream transfer of data from satellite modems 104 and 106 to satellite gateway 102, via satellite 112.

In standard DOCSIS based systems, satellite gateway 102 and satellite modems 104 and 106, periodically send each other Media Access Control (MAC) management messages for a variety of purposes. Such purposes may include, but are not limited to, ranging requests and responses. A ranging request MAC management message consists of a 34 byte packet sent from the SM (104 and/or 106) to satellite gateway 102. Ranging is a process for acquiring the correct timing offset, frequency offset, and SM transmit power such that upstream transmissions of data from SMs are properly aligned. The range request contains information necessary for the gateway to identify which subscriber is generating the range request. Satellite gateway 102 processes the range request and sends a range response back to the corresponding SM (104 and/or 106). The range response contains timing and frequency offset adjustment information used by the SM (104 and/or 106) to maintain proper timing and frequency accuracy.

Figure 2:
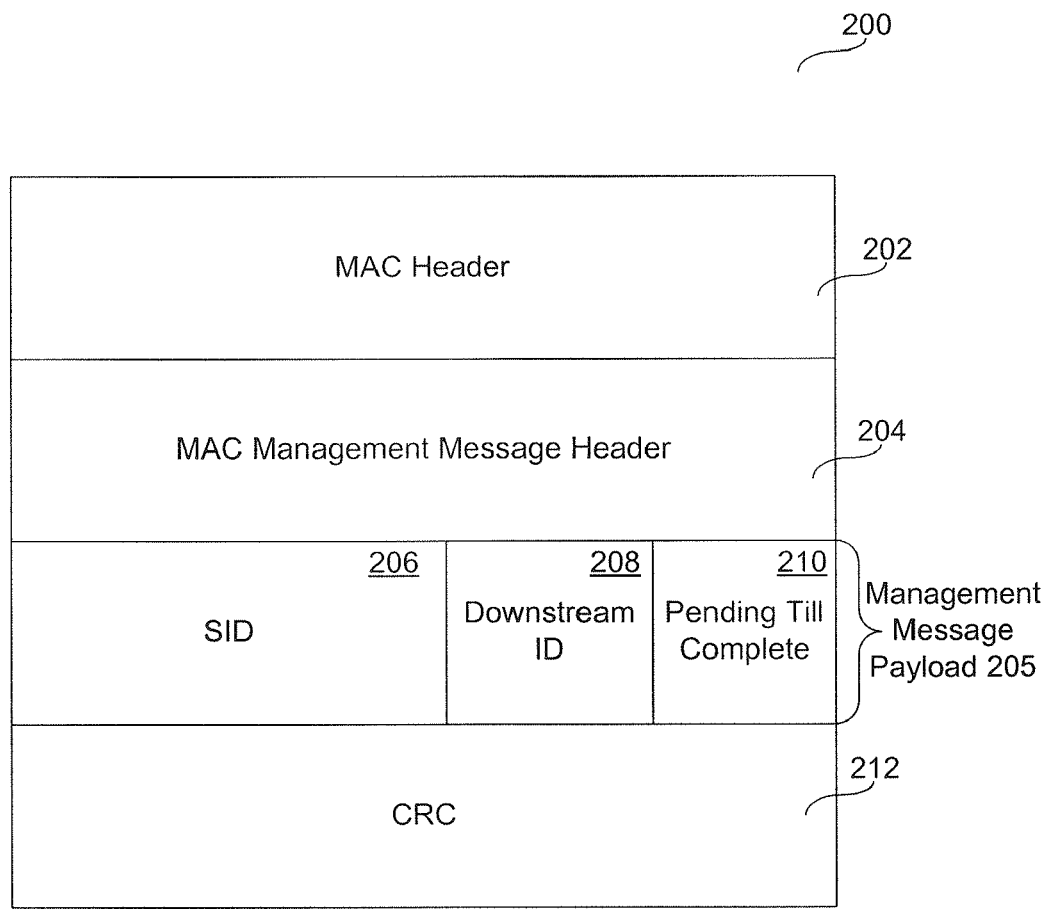
FIG. 2 is a block diagram illustrating a standard DOCSIS range request MAC management message.

FIG. 2 is a diagram illustrating a standard DOCSIS range request MAC management message 200. MAC management messages, such as MAC management message 200 and other MAC management messages described herein, may also be referred to as MAC frames. Standard DOCSIS range request MAC management message 200 comprises a MAC header 202, a MAC management message header 204, a SID field 206, a downstream channel ID field 208, a pending till complete field 210, and a CRC field 212. SID field 206, downstream channel ID field 208, and pending till complete field 210 are located within a management message payload 205.

Figure 2A:
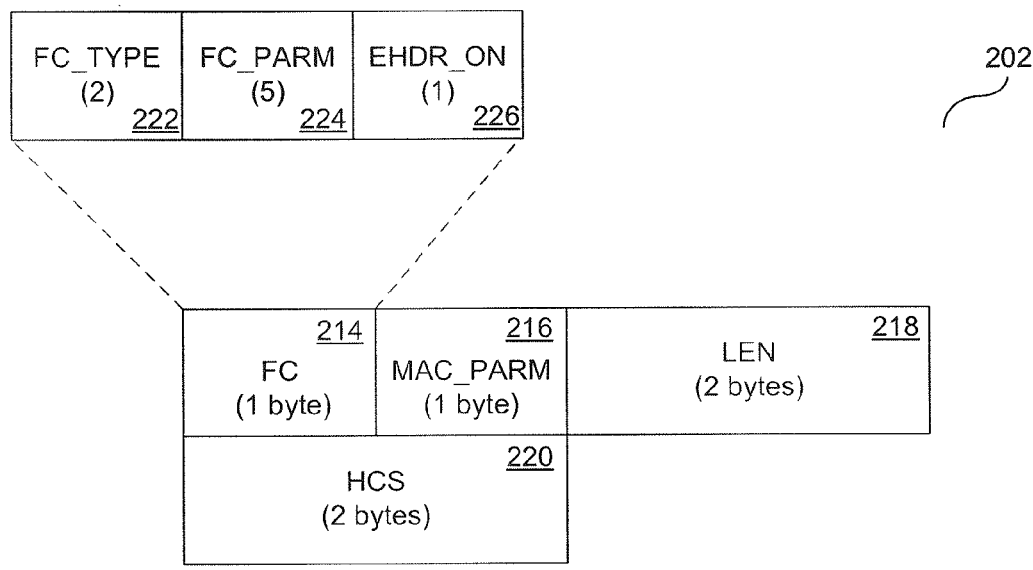
FIG. 2A is a diagram illustrating a standard DOCSIS MAC header.

MAC header 202 is shown in FIG. 2A. MAC header 202 comprises a 1-byte frame control (FC) field 214, a 1-byte MAC parameter (MAC_PARM) field 216, a 2-byte length (LEN) field 218, and a 2-byte header check sequence (HCS) field 220.

FC field 214 identifies the type of MAC header. FC field 214 is comprised of a 2-bit FC_TYPE subfield 222, a 5-bit FC_PARM subfield 224, and a 1-bit EHDR_ON subfield 226. FC_TYPE subfield 222 defines the MAC frame control type. For ranging requests, the MAC frame control type is a MAC specific header. The MAC specific header is represented as a binary "11". FC_PARM subfield 224 represents the parameter bits, and its use is dependent on the type of MAC frame control. In the case of a ranging request, the parameter bits are equivalent to a timing MAC header, which is represented as binary "00000". EHDR_ON subfield 226 indicates whether an extended header field is present. If an extended header field is present, EHDR_ON subfield 226 is represented as a binary "1". If an extended header field is not present, EHDR_ON subfield 226 is represented as a binary "0". For ranging requests, no extended header is used, thus EHDR_ON is a binary "0".

MAC_PARM field 216 is a parameter field. MAC_PARM field 216 is dependent on FC field 214. For example, in an embodiment that uses an extended header, MAC_PARM field 216 indicates the field length of the extended header. In an embodiment that utilizes concatenated frames, MAC_PARM field 216 is used for MAC frame count. In an embodiment utilizing Request frames only, the basic mechanism for requesting bandwidth, MAC_PARM field 216 indicates the number of mini-slots requested. In yet another embodiment, such as, for example, one in which a ranging request is made, MAC_PARM field 216 may be reserved for future use.

LEN field 218 indicates the length of the MAC frame. The length is equal to the number of bytes in the extended header (if used) and the number of bytes following HCS field 220.

HCS field 220 is a 16-bit CRC that ensures the integrity of MAC header 202.

Figure 2B:
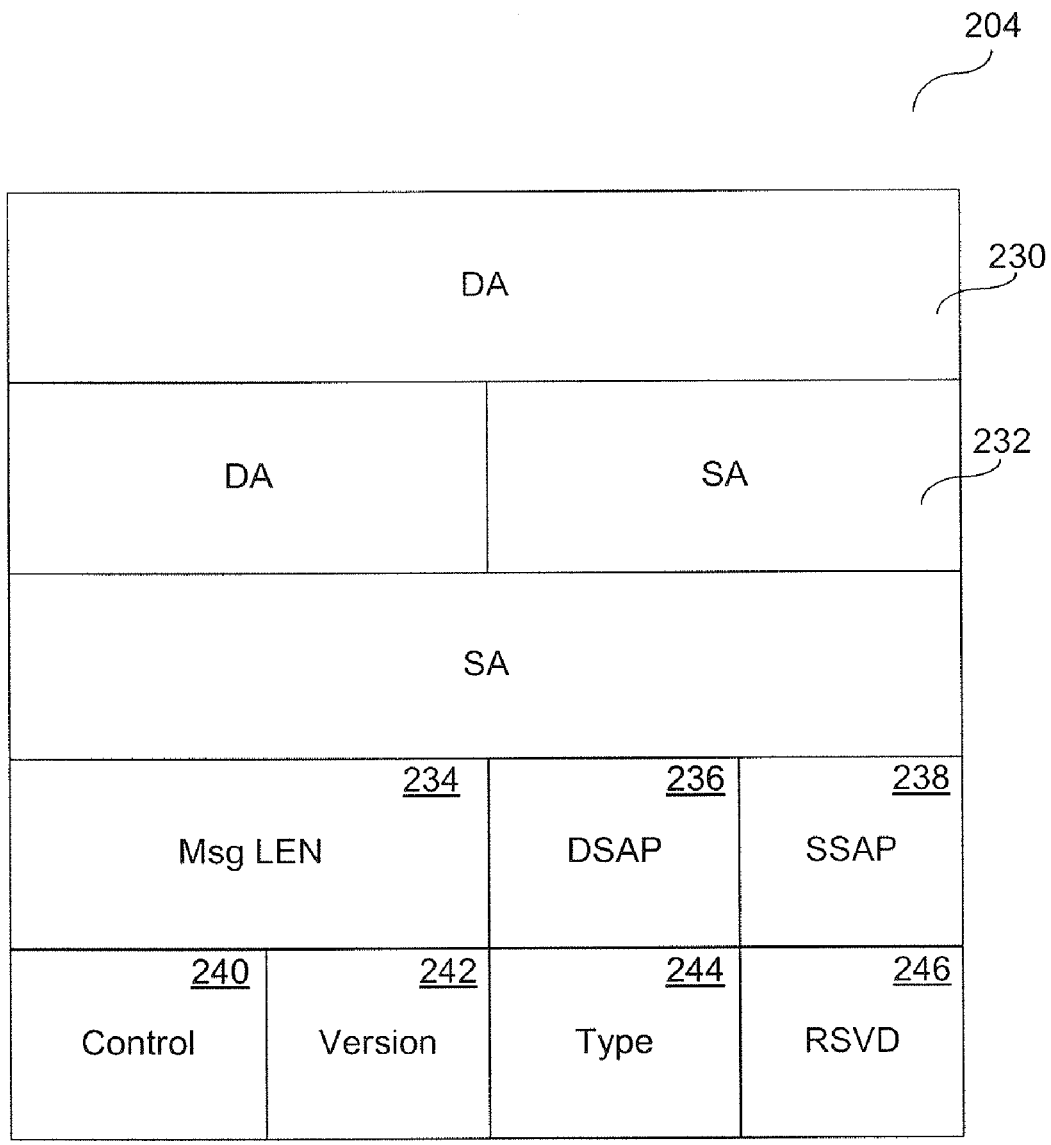
FIG. 2B is a diagram illustrating a standard DOCSIS MAC management message header.

MAC management message header 204 is shown in FIG. 2B. MAC management message header 204 comprises a destination address (DA) field 230, a source address (SA) field 232, a message length (msg LEN) field 234, a DSAP field 236, a SSAP field 238, a control field 240, a version field 242, a type field 244, and a RSVD field 246.

DA field 230 indicates the specific SM unicast address or the DOCSIS management multicast address. SA field 232 indicates the MAC address of the source SM or gateway 102 system. Msg LEN field 234 indicates the length of the MAC message from DSAP field 236 to the end of the payload. DSAP field 236 is the LLC null destination SAP (00). SSAP field 238 is the LLC null source SAP (00). Control field 240 is an unnumbered information frame. DA field 230, SA field 232, msg LEN field 234, DSAP field 236, SSAP field 238, and control field 240 are all well known fields to those skilled in the relevant art(s).

Version field 242 indicates the DOCSIS version in which the message may be used. Messages with a version number of 1 are compliant with all versions of the DOCSIS specification. Messages with a version number of 2 are compliant with DOCSIS 1.1 and 2.0 equipment. Messages with a version number of 3 are compliant with DOCSIS 2.0 equipment. Type field 244 indicates the type of message used. For example, a ranging request is a type 4 message. RSVD field 246 is used to align the message payload on a 32-bit boundary. All of the above fields of MAC management message header 204 are well known to those skilled in the relevant art(s).

Returning to FIG. 2, as previously stated, SID field 206, downstream ID field 208 and pending till complete field 210 are the management message payload 205 fields in standard DOCSIS range request MAC management message 200. SID field 206 is the service ID field. SIDs provide the mechanism by which upstream Quality of Service is implemented. For example, upstream bandwidth is allocated to SIDs and hence to SMs 104 and 106, by satellite gateway 102.

Downstream channel ID field 208 identifies the downstream channel on which the SM received an upstream channel descriptor. The upstream channel descriptor is the MAC management message used to communicate the characteristics of the upstream physical layer to the SMs.

Pending till complete field 210 may indicate that previous ranging response attributes have been applied prior to transmitting the present ranging request or it may indicate the time estimated to be needed to complete assimilation of ranging parameters. If pending till complete field 210 is zero, then all previous ranging response attributes have been applied prior to transmitting the ranging request. If pending till complete field 210 is nonzero, then pending till complete field 210 indicates the time estimated to be needed to complete assimilation of ranging parameters.

Ranging requests are transmitted by SMs at initialization and periodically on request from satellite gateway 102 to determine network delay and request power and frequency adjustment. As previously stated, standard DOCSIS range request MAC management message 200 is used for ranging requests. In making a ranging request, many fields within standard DOCSIS range request MAC management message 200 are not used. In fact, the unused fields in standard DOCSIS range request MAC management message 200 reside within MAC management message header 204. The unused fields include DA field 230, SA field 232, msg LEN field 234, DSAP field 236, SSAP field 238, and control field 240.

As previously stated, the present invention modifies standard DOCSIS range request MAC management message 200 to enable the inclusion of bandwidth requests. The present invention further modifies standard DOCSIS range request MAC management message 200 to provide information that reports various state of health information to gateway 102. Reporting back various state of health information enables gateway 102 to make decisions on how to assign subscribers to queues in an adaptive modulation scheme. Adaptive modulation schemes for broadband communications systems are described in U.S. patent application Ser. No. 10/097,942, entitled "Downstream Adaptive Modulation In DOCSIS Based Communications Systems," filed on Mar. 15, 2002, and U.S. patent application Ser. No. 10/319,929 entitled "Downstream Time Domain Based Adaptive Modulation For DOCSIS Based Applications," filed on Dec. 12, 2002, both of which are incorporated by reference herein in their entireties. The present invention modifies standard DOCSIS range request MAC management message 200 by replacing the unused fields in MAC management message header 204 with a bandwidth request field and fields for state of health information about the status of a downstream transmission received by a given subscriber.

Figure 3:
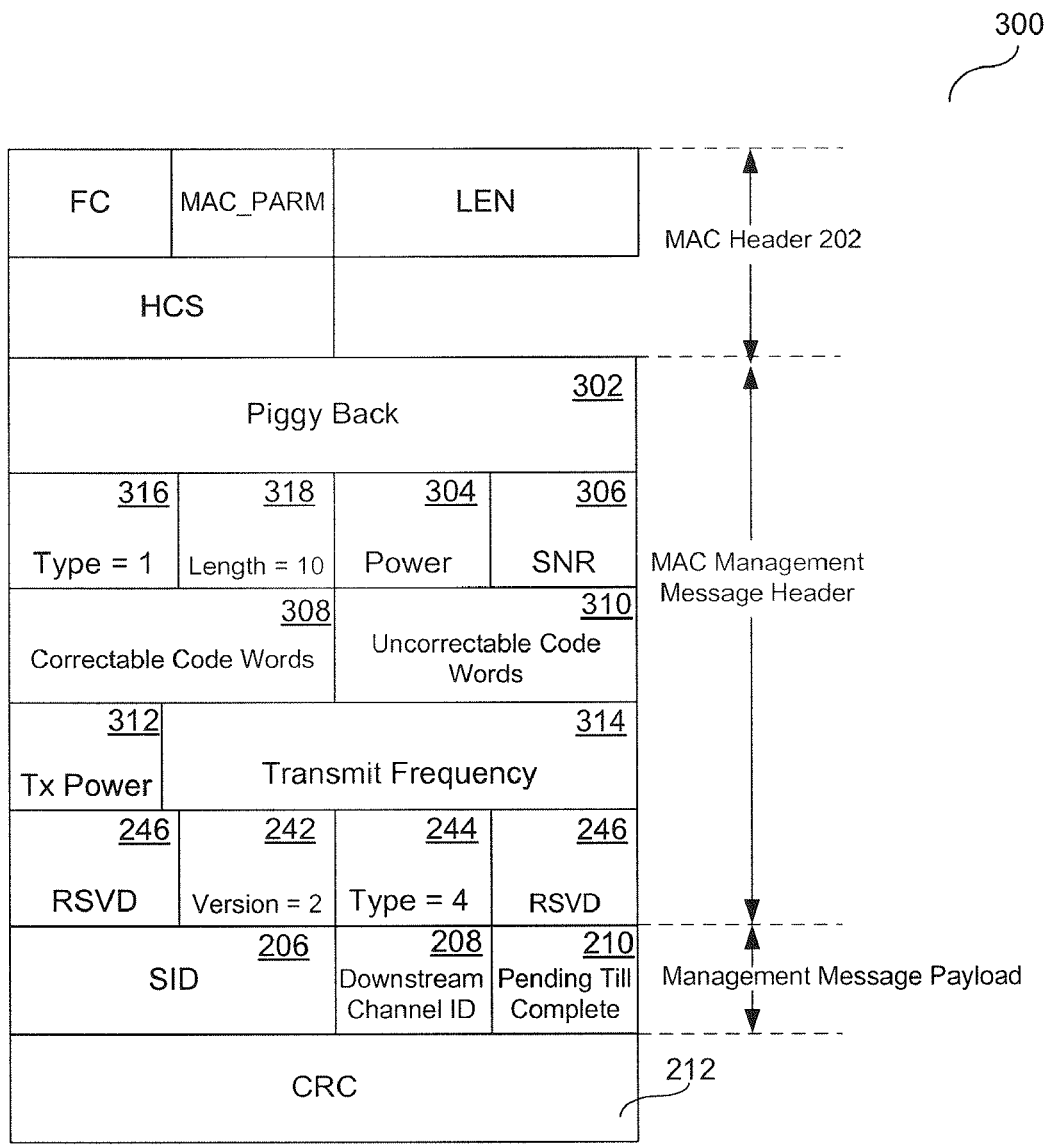
FIG. 3 is a diagram illustrating an exemplary modified range request MAC management message according to an embodiment of the present invention.

FIG. 3 is a diagram illustrating an exemplary modified range request MAC management message 300 according to an embodiment of the present invention. Although FIG. 3 illustrates one embodiment for modifying a range request MAC management message, other arrangements of the fields within modified range request MAC management message 300 may be used. Other state of health parameters may also be utilized.

Modified range request MAC management message 300 maintains a packet size of 34 bytes in order to maintain backward compatibility with hardware implementations that require 34 byte range request MAC management messages. As shown in FIG. 3, the structure of modified range request MAC management message 300 is very similar to the original DOCSIS specification. Modified range request MAC management message 300 includes MAC header 202, MAC management message header 204, management message payload 205, and CRC 212.

Modified range request MAC management message 300 comprises information from SMs, such as SMs 104 and 106, that is currently not included in DOCSIS range request MAC management messages (see FIG. 2). Such information includes data bandwidth requests (implemented within a piggyback request 302), power 304, signal-to-noise ratio (SNR) 306, correctable codeword errors 308, uncorrectable codeword errors 310, transmit power 312, and transmit frequency 314.

Piggyback request 302 is used to request bandwidth for subsequent transmissions. Unlike a request frame, which is the basic mechanism used to request bandwidth, piggyback request 302 is not subject to contention. Thus, piggyback request 302 provides improved performance for requesting bandwidth in broadband communications systems.

Figure 4:
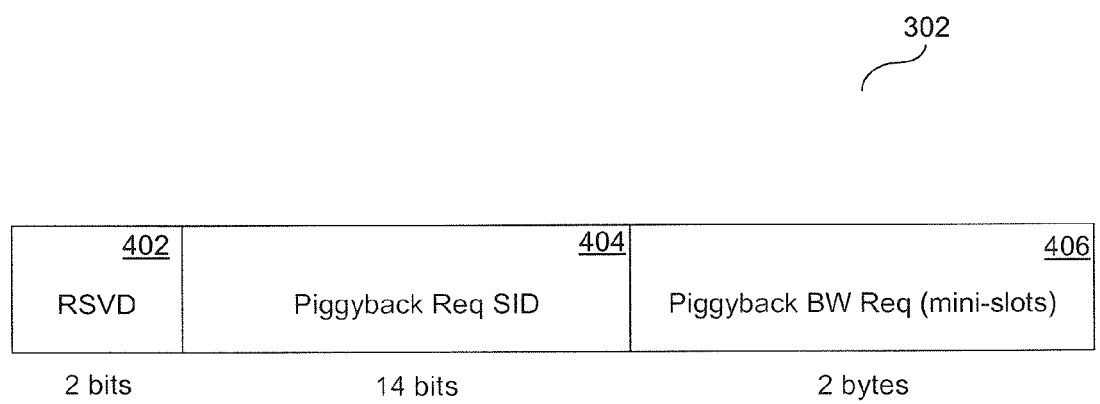
FIG. 4 is a diagram illustrating an exemplary piggyback request field according to an embodiment of the present invention.

FIG. 4 is a diagram illustrating an exemplary piggyback request 302. Piggyback request 302 is comprised of four bytes for requesting bandwidth by a SM. The four bytes include two reserved bits 402, a 14 bit Piggyback Req Service ID (SID) 404, and a two-byte Piggyback Bandwidth Req 406.

The two reserved bits 402 are reserved for possible future use. Piggyback Req Service ID (SID) 404 identifies the SID of the SM for which the bandwidth request is being made. Piggyback Bandwidth Req 406 specifies the number of requested mini-slots for the SID.

Returning to FIG. 3, power byte 304 indicates downstream received power by a SM. The downstream received power is referenced to a known point in the downstream communications system and scaled to a known value, such as, for example, decibels relative to 1 milliwatt (dBm).

SNR byte 306 indicates the downstream signal-to-noise ratio that is measured by the SM. SNR is measured in decibels (dB).

Correctable 308 and uncorrectable 310 code words represent the number of downstream correctable and uncorrectable code words measured from a known starting point by the SM. An example starting point may include the time of the last range request, a reset time known by both gateway 102 and an SM, etc. Correctable 308 and uncorrectable 310 code words are represented as two-byte words in modified range request MAC management message 300.

Transmit power byte 312 represents the upstream transmit power measured or set by some known point in the broadband communications system.

Three-byte transmit frequency field 314 is used to represent the upstream transmit frequency. The upstream transmit frequency is scaled in units known to both gateway 102 and the corresponding SM, such as, for example, SM 104 or 106.

One potential use for RSVD field 246 may be to have SMs specify directly the highest adaptive modulation queue number that they are capable of receiving. Having SMs individually make this computation provides advantages to performing the computation at the satellite gateway.

The remaining fields of modified range request MAC management message 300 are similar or identical to the fields in standard DOCSIS range request MAC management message 200. The first six bytes of message 300 include FC field 202, MAC_PARM field 204, LEN field 206, and HCS field 208. These fields are identical to the fields in standard DOCSIS range request MAC management message 200 to allow existing systems to recognize the MAC frame as a ranging request packet. Fields remaining after transmit frequency field 314 are also similar to the fields in standard DOCSIS range request MAC management message 200.

To provide for flexibility, the MAC management message header parameters are encoded in a type/length/value (TLV) form in which the type and length fields are each 1 byte long. Thus, MAC management message header also comprises a type field 316 and a length field 318 to allow for standard DOCSIS TLV-type processing of the new parameters in the MAC management message header. Type field 316 indicates that the information contained in the MAC management message header contains parameters for a modified ranging request. Length field 318 indicates the length of the remaining fields in the MAC management message header.

Figure 5:
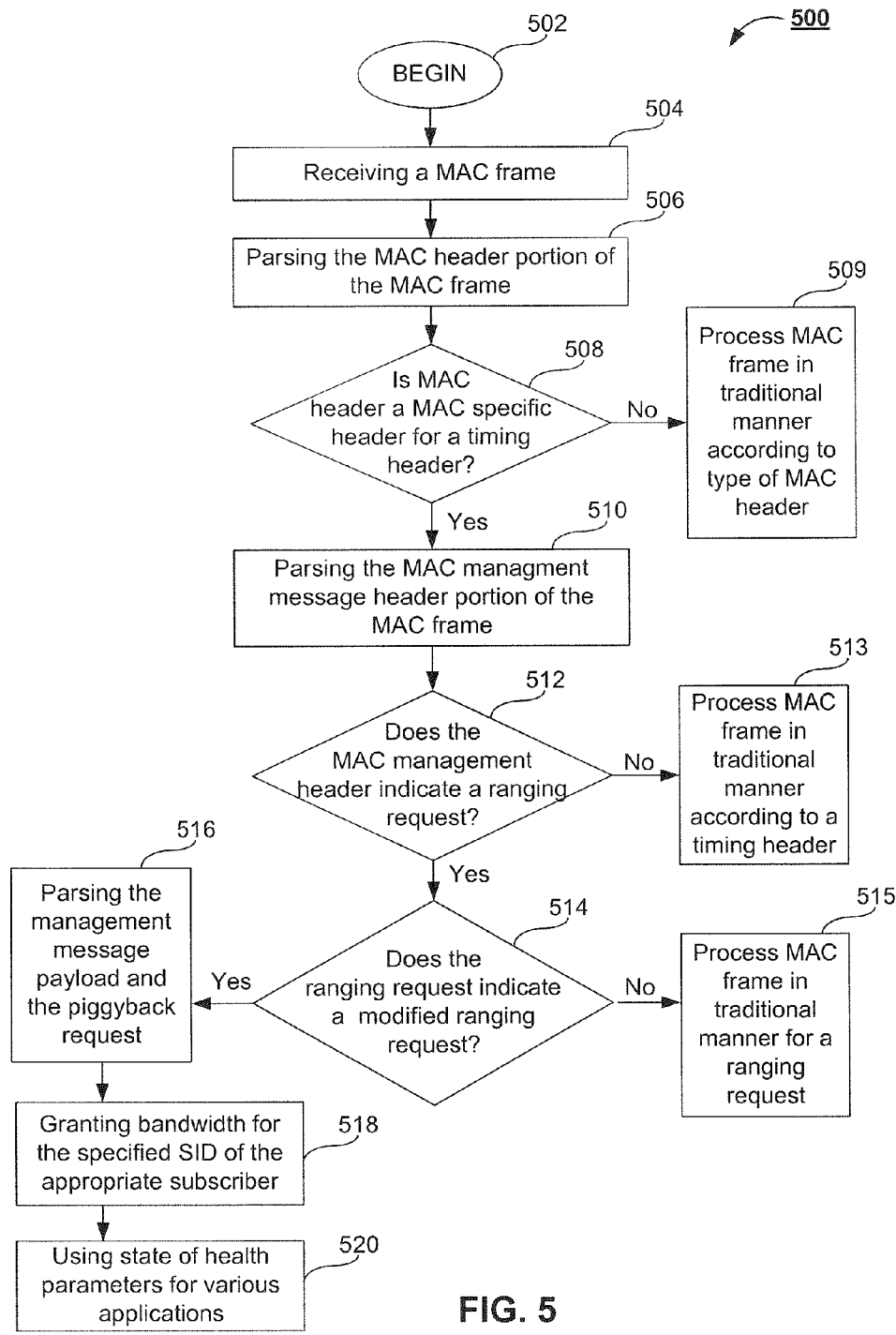
FIG. 5 is a flow diagram illustrating a method for enabling receipt of a piggyback request and information relating to the status of a downstream transmission received by a given subscriber according to an embodiment of the present invention.

FIG. 5 is a flow diagram 500 illustrating a method for enabling receipt of a piggyback request and information relating to the status of a downstream transmission received by a given subscriber according to an embodiment of the present invention. The invention is not limited to the description provided herein with respect to flow diagram 500. Rather, it will be apparent to persons skilled in the relevant art(s) after reading the teachings provided herein that other functional flow diagrams are within the scope of the present invention. The process begins with step 502, where the process immediately proceeds to step 504.

In step 504, a MAC frame is received by a central location. The central location may be a satellite gateway, a headend, or a wireless access termination system. Upon receipt of the MAC frame, in step 506 the MAC header portion of the MAC frame is parsed to determine the type of MAC header.

In decision step 508 it is determined whether the type of MAC header is a MAC specific header for a timing header. If it is determined that the type of MAC header is a MAC specific header for a timing header, the process proceeds to step 510. If it is determined that the type of MAC header is not a MAC specific header for a timing header, the process then proceeds to step 509, where the MAC frame is processed in a traditional manner according to the type of MAC header.

In step 510, the MAC management message header is parsed. In decision step 512, type field 244 is checked to determine whether the MAC management message header indicates a ranging request. If the MAC management message header indicates a ranging request, then the process proceeds to decision step 514. If the MAC management message header does not indicate a ranging request, the process proceeds to step 513, where the MAC frame is processed in a traditional manner for a timing header.

In decision step 514, it is determined whether the ranging request is a modified ranging request. Version field 242 may be used to determine whether the ranging request is a modified ranging request. If it is determined that the ranging request is a modified ranging request, the process proceeds to step 516. If it is determined that the ranging request is a standard DOCSIS ranging request, the process proceeds to step 515, where the MAC frame is processed in a traditional manner for a standard DOCSIS ranging request.

In step 516, the management message payload and the piggyback request are parsed. The process then proceeds to step 518.

In step 518, bandwidth for the specified SID of the specific subscriber equipment is allocated in an allocation MAP by indication of a Data Grant. Thus, when the specific subscriber equipment, such as a cable modem, a satellite modem, or a wireless modem, obtains the next allocation MAP, the allocation MAP will specify a timed minislot period in which the specific subscriber may transmit data without contention.

In step 520, the state of health parameters obtained from parsing the MAC management message header are utilized by the central location in various applications. For example, as previously stated, the state of health parameters may be used to enable the central location to determine how to assign subscribers to queues in an adaptive modulation scheme. Other uses by the central location of the state of health parameters may also by applied.

Conclusion

The previous description of the preferred embodiments is provided to enable any person skilled in the art to make or use the present invention. While the invention has been particularly shown and described with reference to preferred embodiments thereof, it will be understood by those skilled in the art that various changes in form and detail may be made therein without departing from the spirit and scope of the invention.

What is claimed is:

1. A remote subscriber within a communications system, comprising:
a transceiver configured:
(i) to transmit a range request media access control (MAC) management message having a header that includes a request to perform initial ranging and a bandwidth request for subsequent upstream data transmissions to a central location, and
(ii) to receive a range response from the central location in response to the range request MAC management message, the range response including timing and frequency offset adjustment information to be used by the remote subscriber and a bandwidth grant for the subsequent upstream data transmissions.

2. The remote subscriber of claim 1, wherein the remote subscriber is implemented as part of:
a cable modem;
a wireless cable modem; or
a satellite modem.

3. The remote subscriber of claim 1, wherein the range response further includes a transmit power of the remote subscriber.

4. The remote subscriber of claim 1, wherein the range request MAC management message is a modified Data Over Cable Service Interface Specification (DOCSIS) specification range request MAC management message.

5. The remote subscriber of claim 1, wherein the range request MAC management message comprises:
a management message payload.

6. The remote subscriber of claim 5, wherein the header comprises:
state of health parameters.

7. The remote subscriber of claim 6, wherein the state of health parameters comprise:
a signal-to-noise (SNR) ratio;
correctable codeword errors;
uncorrectable codeword errors;
a received power;
a transmit power; or
a transmit frequency.

8. The remote subscriber of claim 5, wherein the header comprises:
a piggyback request configured to enable the remote subscriber to make the bandwidth request for subsequent transmissions.

9. The remote subscriber of claim 8, wherein the piggyback request comprises:
a Service ID (SID) configured to identify a SID of the remote subscriber; and
the bandwidth request configured to specify a number of requested mini-slots.

10. The remote subscriber of claim 1, wherein the remote subscriber is selected from among a plurality of remote subscribers, and wherein the transceiver is further configured to transmit the range request MAC management message without contention from other remote subscribers from among the plurality of remote subscribers.

11. A central location within a communications system, comprising:
a transceiver configured:
(i) to receive a range request media access control (MAC) management message having a header that includes a request to perform initial ranging and a bandwidth request for subsequent upstream data transmissions from a remote subscriber, and
(ii) to transmit a range response to the remote subscriber in response to the range request MAC management message, the range response including timing and frequency offset adjustment information and a bandwidth grant for the subsequent upstream data transmissions to be used by the remote subscriber.

12. The central location of claim 11, wherein the central location is implemented as part of:
a headend for a cable system;
a wireless access termination system (WATS); or
a satellite gateway.

13. The central location of claim 11, wherein the range response further includes a transmit power of the remote subscriber.

14. The central location of claim 11, wherein the range request MAC management message is a modified Data Over Cable Service Interface Specification (DOCSIS) specification range request MAC management message.

15. The central location of claim 11, wherein the range request MAC management message comprises:
a management message payload.

16. The central location of claim 15, wherein the header comprises:
state of health parameters.

17. The central location of claim 16, wherein the state of health parameters comprise:
a signal-to-noise (SNR) ratio;
correctable codeword errors;
uncorrectable codeword errors;
a received power;
a transmit power; or
a transmit frequency.

18. The central location of claim 15, wherein the header comprises:
a piggyback request configured to enable the remote subscriber to make the bandwidth request for subsequent transmissions.

19. The central location of claim 18, wherein the piggyback request comprises:
a Service ID (SID) configured to identify a SID of the central location; and
the bandwidth request configured to specify a number of requested mini-slots.

20. The central location of claim 11, wherein the remote subscriber is selected from among a plurality of remote subscribers, and wherein the transceiver is further configured to receive the range request MAC management message without contention from other remote subscribers from among the plurality of remote subscribers.

21. The remote subscriber of claim 1, wherein a piggyback request included in the range request MAC management message is configured to include the bandwidth request, the piggyback request not being subject to contention from requests from other remote subscribers.

22. The remote subscriber of claim 1, wherein the bandwidth request is not subject to contention from requests from other remote subscribers.

* * * * *